(12) United States Patent
Tamura

(10) Patent No.: US 10,466,521 B2
(45) Date of Patent: Nov. 5, 2019

(54) DISPLAY DEVICE

(71) Applicant: Semiconductor Energy Laboratory Co., Ltd., Atsugi-shi, Kanagawa-ken (JP)

(72) Inventor: Hikaru Tamura, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 15/224,720

(22) Filed: Aug. 1, 2016

(65) Prior Publication Data

US 2016/0342000 A1    Nov. 24, 2016

Related U.S. Application Data

(63) Continuation of application No. 12/693,841, filed on Jan. 26, 2010, now Pat. No. 9,411,421.

(30) Foreign Application Priority Data

Jan. 28, 2009    (JP) ................................ 2009-016534

(51) Int. Cl.
*G02F 1/1333* (2006.01)
*G06F 3/0488* (2013.01)
(Continued)

(52) U.S. Cl.
CPC ........ *G02F 1/13338* (2013.01); *G02F 1/1339* (2013.01); *G02F 1/1368* (2013.01);
(Continued)

(58) Field of Classification Search
CPC .. G02F 1/13338; G02F 1/1368; G02F 1/1339; G06F 3/045; G06F 3/044;
(Continued)

(56) References Cited

U.S. PATENT DOCUMENTS 5,715,505 A    2/1998  Tombs et al.
7,084,933 B2   8/2006  Oh et al.
(Continued)

FOREIGN PATENT DOCUMENTS

CN    001501317 A    6/2004
EP       1349141 A   10/2003
(Continued)

OTHER PUBLICATIONS

Chinese Office Action (Application No. 201010120431.3) dated Nov. 1, 2013.
(Continued)

*Primary Examiner* — William Boddie
*Assistant Examiner* — Saifeldin E Elnafia
(74) *Attorney, Agent, or Firm* — Fish & Richardson P.C.

(57) ABSTRACT

To provide a display device including a touch sensor, in which input feeling can be obtained and deterioration of image quality is suppressed. The display device includes a touch sensor portion, a display panel, an elastic member, and a support. The touch sensor portion is provided over the display panel. The support is provided below the display panel. The elastic member is provided between the display panel and the support. The elastic member is provided in part of the periphery of a pixel region included in the display panel or in the entire periphery.

16 Claims, 11 Drawing Sheets

(51) Int. Cl.
*G06F 3/01* (2006.01)
*G06F 3/041* (2006.01)
*G02F 1/1339* (2006.01)
*G02F 1/1368* (2006.01)
*G06F 3/042* (2006.01)
*G06F 3/044* (2006.01)
*G06F 3/045* (2006.01)
*G06F 3/046* (2006.01)

(52) U.S. Cl.
CPC .............. *G06F 3/016* (2013.01); *G06F 3/041* (2013.01); *G06F 3/044* (2013.01); *G06F 3/045* (2013.01); *G06F 3/046* (2013.01); *G06F 3/0421* (2013.01); *G06F 3/0488* (2013.01); *G06F 3/04886* (2013.01)

(58) Field of Classification Search
CPC .... G06F 3/016; G06F 3/04486; G06F 3/0488; G06F 3/041; G06F 3/0421
See application file for complete search history.

(56) References Cited

U.S. PATENT DOCUMENTS

| | | | |
|---|---|---|---|
| 7,095,461 | B2 | 8/2006 | Kim |
| 7,098,880 | B2 | 8/2006 | Inoue et al. |
| 7,148,944 | B2 | 12/2006 | Kinoshita et al. |
| 7,292,227 | B2 | 11/2007 | Fukumoto et al. |
| 7,369,209 | B2 | 5/2008 | Kinoshita et al. |
| 7,519,292 | B2 | 4/2009 | Takahashi et al. |
| 7,804,479 | B2 | 9/2010 | Furukawa et al. |
| 7,956,939 | B2 | 6/2011 | Kubota et al. |
| 8,018,554 | B2 | 9/2011 | Fujita |
| 2003/0218593 | A1 | 11/2003 | Inoue et al. |
| 2004/0179165 | A1* | 9/2004 | Kinoshita ......... G02F 1/133305 349/158 |
| 2006/0256093 | A1 | 11/2006 | Furukawa et al. |
| 2007/0085837 | A1 | 4/2007 | Ricks et al. |
| 2007/0229478 | A1 | 10/2007 | Rosenberg et al. |
| 2009/0002328 | A1 | 1/2009 | Ullrich et al. |
| 2009/0046069 | A1 | 2/2009 | Griffin et al. |
| 2010/0214242 | A1 | 8/2010 | Casiez et al. |

FOREIGN PATENT DOCUMENTS

| | | |
|---|---|---|
| EP | 1655956 A | 5/2006 |
| EP | 1975684 A | 10/2008 |
| EP | 2060967 A | 5/2009 |
| EP | 2060968 A | 5/2009 |
| EP | 2105825 A | 9/2009 |
| JP | 58-015242 | 1/1983 |
| JP | 05-143233 A | 6/1993 |
| JP | 07-166668 A | 7/1995 |
| JP | 09-050241 A | 2/1997 |
| JP | 09-114590 A | 5/1997 |
| JP | 09-146706 A | 6/1997 |
| JP | 09-282987 A | 10/1997 |
| JP | 2000-131718 A | 5/2000 |
| JP | 2000-137576 A | 5/2000 |
| JP | 2000-250709 A | 9/2000 |
| JP | 2001-051608 A | 2/2001 |
| JP | 2002-149346 A | 5/2002 |
| JP | 2002-182831 A | 6/2002 |
| JP | 2002-182855 A | 6/2002 |
| JP | 2003-197056 A | 7/2003 |
| JP | 2004-272714 A | 9/2004 |
| JP | 2006-134180 A | 5/2006 |
| JP | 2006-250985 A | 9/2006 |
| JP | 2006-317682 A | 11/2006 |
| JP | 2008-130055 A | 6/2008 |
| JP | 2008-181150 A | 8/2008 |
| JP | 2008-181438 A | 8/2008 |
| JP | 2008-186188 A | 8/2008 |
| JP | 2008-216844 A | 9/2008 |
| JP | 2009-064074 A | 3/2009 |
| TW | 200304629 | 10/2003 |
| TW | 584827 | 4/2004 |
| TW | 200844579 | 11/2008 |
| WO | WO-2003/098580 | 11/2003 |

OTHER PUBLICATIONS

Taiwanese Office Action(Application No. 99101646) dated Sep. 9, 2014.
Taiwanese Office Action (Application No. 104116960) dated Feb. 17, 2016.

* cited by examiner

DISPLAY DEVICE

CROSS-REFERENCE TO RELATED APPLICATIONS

This application is a continuation of U.S. application Ser. No. 12/693,841, filed Jan. 26, 2010, now allowed, which claims the benefit of a foreign priority application filed in Japan as Serial No. 2009-016534 on Jan. 28, 2009, both of which are incorporated by reference.

BACKGROUND OF THE INVENTION

1. Field of the Invention

The present invention relates to a display device and a method for manufacturing the display device. In particular, the present invention relates to a display device having a touch sensor and a display portion and to a method for manufacturing the display device. In addition, the present invention relates to an electronic device in which an electro-optical device typified by a liquid crystal display panel or a light-emitting device including a light-emitting element is mounted.

2. Description of the Related Art

In recent years, the market of liquid crystal displays and electroluminescence (EL) displays has grown, and the importance of the added value of panels has been increasing. Above all, touch panels have attracted attention as user interfaces and have been introduced into mobile devices such as portable game machines.

However, unlike conventional physical buttons, the touch panels can perform recognition only by the sense of sight. Therefore, it is difficult for a user to feel the sense of input at the time of input.

Thus, as disclosed in Reference 1, there is a proposal in which a columnar spacer which can be transformed and a soft film are provided on a panel display surface and movement such as being depressed at the time of input is provided to create input feeling.

In addition, as disclosed in Reference 2, a technique in which a click member having a hollow truncated cone shape is provided to obtain the sense of clicking is proposed.

In Reference 1, since a columnar spacer is arranged in an upper portion of the panel display surface, an image is displayed through the columnar spacer.

In Reference 2, an image is displayed through the click member having a complex shape.

REFERENCE

Reference 1: Japanese Published Patent Application No. 2002-149346

Reference 2: Japanese Published Patent Application No. 2004-272714

SUMMARY OF THE INVENTION

An object of one embodiment of the present invention is to provide a device provided with a touch sensor from which input feeling can be obtained.

An object of one embodiment of the present invention is to suppress deterioration of image quality of a device provided with a touch sensor.

An object of one embodiment of the present invention is to provide a device provided with a touch sensor in which deterioration of image quality is suppressed in operating the touch sensor.

An object of one embodiment of the present invention is to improve recognition accuracy in a device provided with an optical sensor.

According to one embodiment of the present invention, a member which creates operational feeling is not provided inside a touch sensor portion or between the touch sensor portion and a display panel. Specifically, the touch sensor portion is provided over the display panel and an elastic member is provided below the display panel.

Here, an elastic member in this specification refers to an elastic member which can expand and contract by application of compressive stress or tensile stress. An elastic member can be described simply as an elastic body. As an elastic member, a bulk elastic body whose volume is changed or a form-elastic body whose shape is changed can be used. For example, a sponge using urethane or the like, rubber (natural rubber, synthetic rubber, or the like), cushion tape, a spring, or the like can be used. In addition, an elastic member whose Young's module is greater than or equal to $1.0 \times 10^6$ Pa and less than or equal to $1.0 \times 10^7$ Pa can be used.

An elastic member can be provided at an end portion of the display panel. For example, the elastic members are provided at least at four corners of the display panel, so that operational feeling and input feeling can be obtained when the touch sensor portion is pressed. Alternatively, the elastic member can be provided to cover the periphery of a pixel portion included in the display panel. Thus, input feeling with favorable uniformity can be obtained in the entire region of the touch sensor portion. Alternatively, the elastic member can be provided in matrix below the display panel. Thus, input feeling with favorable uniformity can be obtained in the entire region of the touch sensor portion.

When the display panel has a liquid crystal layer, a backlight unit can be used as a support. Note that the elastic member may be provided below the backlight unit.

According to one embodiment of the present invention, a display device includes a touch sensor portion, a display panel, an elastic member, and a support. The touch sensor portion is provided over the display panel, the support is provided below the display panel, and the elastic member is provided between the display panel and the support.

According to one embodiment of the present invention, a display device includes a display panel, a touch sensor portion provided over the display panel, a support provided below the display panel, and an elastic member provided between the display panel and the support and at least at an end portion of the display panel.

According to one embodiment of the present invention, a display device includes a display panel, a touch sensor portion provided over the display panel, a support provided below the display panel, and an elastic member provided between the display panel and the support to cover at least at a periphery of a pixel portion included in the display panel.

According to one embodiment of the present invention, a display device includes a display panel, a touch sensor portion provided over the display panel, a support provided below the display panel, and an elastic member provided between the display panel and the support and provided in matrix at least in a region which overlaps with a pixel portion included in the display panel.

As one mode of a display device of the present invention, a display panel includes a liquid crystal element, an electron emitter, or a light-emitting element.

In this specification, a semiconductor device refers to all types of devices which can function by using semiconductor characteristics. An electro-optical device, a light-emitting device, a semiconductor circuit, and an electronic device are all included in the category of semiconductor devices.

According to one embodiment of the present invention, when the touch sensor portion is provided over the display panel and the elastic member is provided below the display panel, input feeling can be obtained because the elastic member contracts when the touch sensor portion is pressed. In addition, since the elastic member is arranged not over the display panel but below the display panel, deterioration of image quality due to the existence of the elastic member over the display panel can be suppressed. Accordingly, a high-definition display device can be provided.

According to one embodiment of the present invention, when the touch sensor portion is provided over the display panel and the elastic member is provided below the display panel, the elastic member contracts when the touch sensor portion is pressed and the touch sensor portion works with the display panel. Therefore, variation of a distance between the touch sensor portion and the display panel can be eliminated or suppressed, and deterioration of image quality can be suppressed even when the touch sensor portion is pressed. Accordingly, a high-definition display device can be provided.

According to one embodiment of the present invention, an optical sensor is used as a sensor and a backlight unit is used as the support. When the touch sensor portion or a display panel provided with the optical sensor is pressed, the optical sensor comes close to the backlight unit, which leads to increasing the intensity of light which is emitted from the backlight unit serving as a light source and is reflected by an object to be detected so that the light enters the optical sensor. Therefore, the variation of light is added to detection treatment, so that recognition accuracy can be improved.

DETAILED DESCRIPTION OF THE INVENTION

Figure 1A:
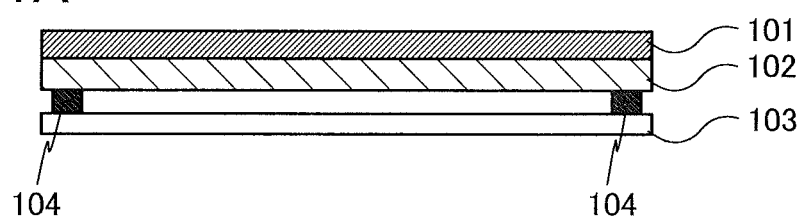
FIGS. 1A and 1B illustrate an example of a display device according to one embodiment of the present invention.

The present invention will be fully described by way of embodiments with reference to the accompanying drawings.

In the structures to be given below, the same portions or portions having similar functions are denoted by the same reference numerals in different drawings, and description thereof will not be repeated.

Embodiment 1

In this embodiment, a structure of a display device will be described with reference to FIGS. 1A and 1B, FIGS. 2A to 2D, and FIGS. 3A and 3B.

Figure 1B:
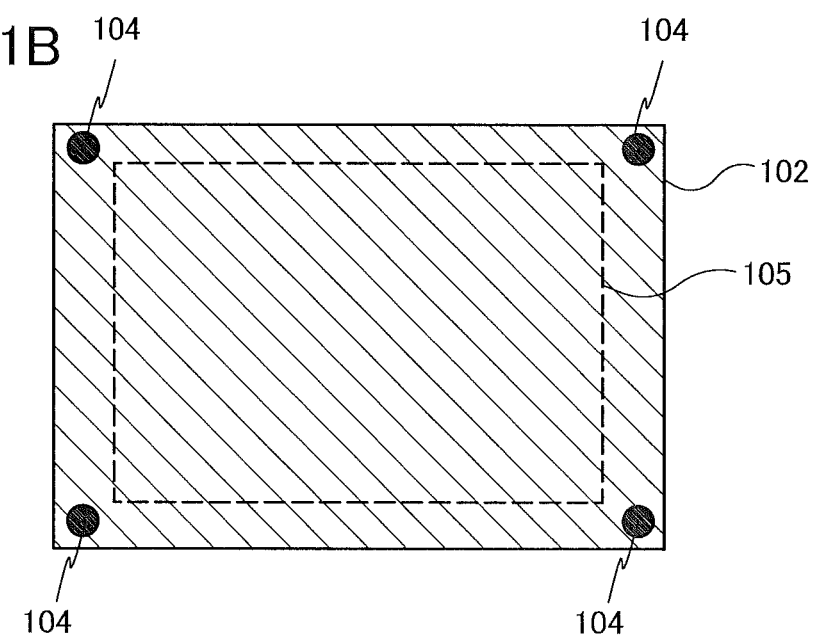

FIG. 1A is a cross-sectional view of a display device. A touch sensor portion 101 is provided over a display panel 102, and a support 103 is provided below the display panel 102. Elastic members 104 are provided between the display panel 102 and the support 103. A bottom view of a display device in which the support 103 is omitted is illustrated in FIG. 1B. The elastic members 104 are provided at end portions of the display panel 102. The elastic members 104 are preferably provided so as not to overlap with a pixel portion 105 included in the display panel 102 because an aperture ratio can be prevented from decreasing.

The touch sensor portion 101 can be provided with a touch sensor such as a resistive film touch sensor, a capacitive touch sensor, an electromagnetic induction touch sensor, or an optical touch sensor.

A variety of elements, such as a display element or a light-emitting element, can be used for the display panel 102. For example, a liquid crystal element, an electroluminescence (EL) element, an electron emitter, electronic ink, an electrophoretic element, or the like can be used.

As the support 103, any material can be used as long as it can support the elastic members 104. For example, a printed circuit board (PCB), a printed wiring board (PWB), a rear cover member of an electronic device, or the like can be used. When the display panel 102 includes a liquid crystal element, a backlight unit can be used for the support 103. As the backlight unit, an edge-light type backlight unit or a direct type backlight unit can be used. As a light source of a backlight, an LED can also be used.

As the elastic members 104, elastic members which can expand and contract by application of compressive stress or tensile stress can be used. As the elastic members 104, for example, a sponge using urethane or the like, rubber (natural rubber, synthetic rubber, or the like), cushion tape, a spring, or the like can be used. Although the elastic members 104 each have a columnar shape in FIGS. 1A and 1B, a rectangular solid may also be used, for example. Alternatively, the above material having a light-transmitting property can also be used.

In particular, a sponge using urethane or the like, rubber (natural rubber, synthetic rubber, or the like), and cushion tape each have a simple structure, and the height of the elastic member can be easily controlled as compared with an expansion and contraction means having a large-scale mechanical structure. Accordingly, the sponge, the rubber, and the cushion tape are particularly preferable for a small display device such as a portable information terminal.

The height of the elastic members 104 preferably lies within the range of 0.5 mm to 20 mm inclusive, more preferably, 2 mm to 15 mm inclusive, still more preferably, 5 mm to 10 mm inclusive because input feeling can be obtained when the touch sensor portion 101 is pressed.

The elastic members 104 can be bonded to the display panel 102 and the support 103 using an adhesive which is not illustrated. Note that when the elastic members 104 each have viscosity itself, an adhesive is unnecessary.

In FIG. 1B, the elastic members 104 are provided at four corners of the display panel 102; however, the arrangement of the elastic members 104 is not limited to this.

In FIGS. 2A to 2D, examples of arrangement and shape of an elastic member, which are different from that of the elastic members 104 illustrated in FIGS. 1A and 1B are described.

Figure 2A:
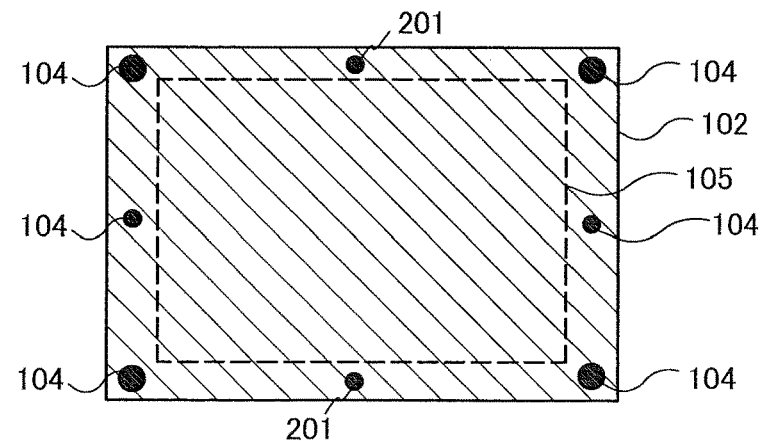
FIGS. 2A to 2D each illustrate an example of a display device according to one embodiment of the present invention.

In addition to the elastic members 104 (first elastic members) at four corners illustrated in FIG. 1B, a structure in which elastic members 201 (second elastic members) which do not overlap with a pixel portion are provided between the adjacent elastic members 104 is illustrated in FIG. 2A. The diameter of the elastic member 201 may be the same as or different from the diameter of the elastic member 104. To maintain the uniform distance between the display panel 102 and the support 103, it is preferable that the height of each elastic member 104 be the same as the height of each elastic member 201. Compared with FIG. 1B, when an end portion of the touch sensor portion 101 is pressed, the touch sensor portion 101 and the display panel 102 sink while keeping parallel to the support 103; therefore, input feeling with favorable uniformity can be obtained.

Figure 2B:
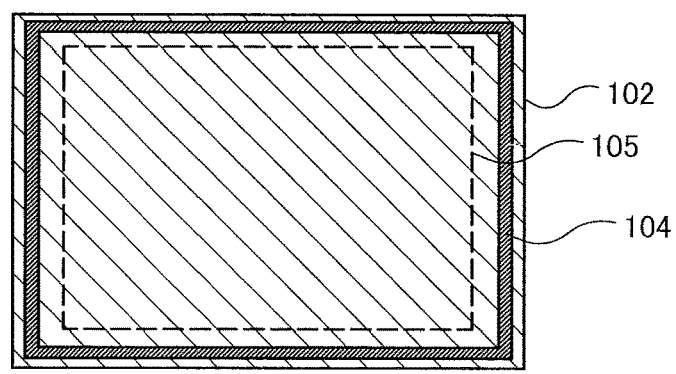

A structure is illustrated in FIG. 2B, in which the elastic member 104 is provided to surround the periphery of the pixel portion 105 included in the display panel 102. Compared with FIG. 1B, input feeling with favorable uniformity can be obtained. Note that the structure is particularly effective in the case where the proportion of the pixel portion 105 to the display panel 102 increases and a frame is narrowed, or in the case where the structure is used for a small-sized display device or a medium-sized display device. Compared with the case where it is difficult to obtain input feeling due to its own weight of the panel or the like when the elastic members 104 are provided only at end portions of the display panel 102, a large surface area of the elastic member 104 can be obtained, whereby comfortable input feeling can be obtained.

Figure 2C:
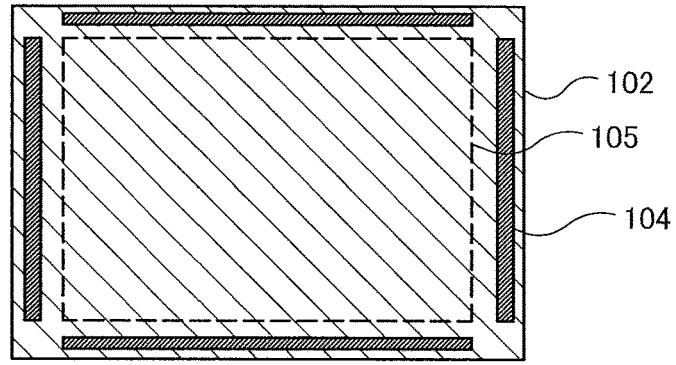

In FIG. 2C, openings are provided at four corners of the display panel 102 and the elastic members 104 are provided at outer peripheral regions of the display panel 102. In other words, the elastic members 104 each having a stripe shape are provided facing sides of the pixel portion 105. In a similar manner to FIG. 2B, this structure is effective in that large surface areas of the elastic members 104 can be obtained in the case where it is difficult to obtain input feeling due to its own weight of the panel.

Figure 2D:
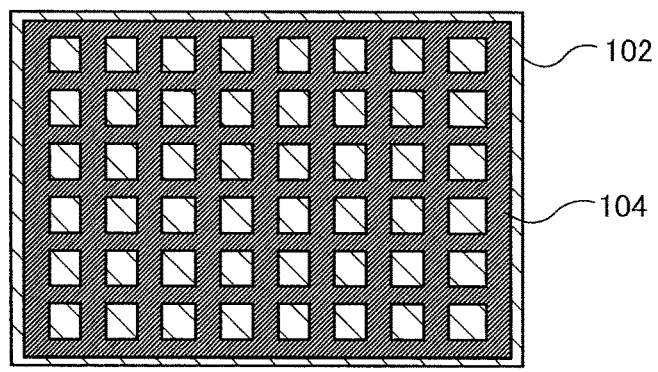

In FIG. 2D, the elastic member 104 is arranged in matrix over the display panel 102. When the elastic member 104 is arranged in matrix, uniformity of input feeling and operational feeling can be increased. In addition, although a medium-sized display device or a large-sized display device bends due to its own weight in some cases, a bend in the center of the display panel 102 can be suppressed by use of this structure. Alternatively, the elastic member may be arranged in a hash symbol.

When the display panel 102 has a liquid crystal element, the elastic member 104 is preferably arranged in a lattice shape so as to periodically overlap with several to several hundreds of wirings which are electrically connected to gates of transistors provided in the pixel portion 105 and of wirings which are electrically connected to sources or drains of the transistors. This is because an influence of decreasing an aperture ratio in the pixel portion 105 can be suppressed. Although an example in which the width of the elastic member 104 is uniform is illustrated in FIG. 2D, the width of the elastic member in a region which overlaps with the pixel portion 105 is preferably smaller than the width of the elastic member in a region which does not overlap with the pixel portion 105.

When the display panel 102 has a self-luminous light-emitting element, there is a lot of flexibility in arrangement because the arrangement of the elastic member 104 has no influence on display through the touch sensor portion. Accordingly, the structure illustrated in FIG. 2D is particularly preferable when a light-emitting element is used for the display panel 102.

When a light-emitting element is included, a backlight unit does not need to be used as the support. Therefore, even when a logic circuit, a driver circuit, or the like is built in the support provided below the display panel, luminance does not decrease, and the frame of the display panel provided with the pixel portion can be narrowed.

Figure 9:
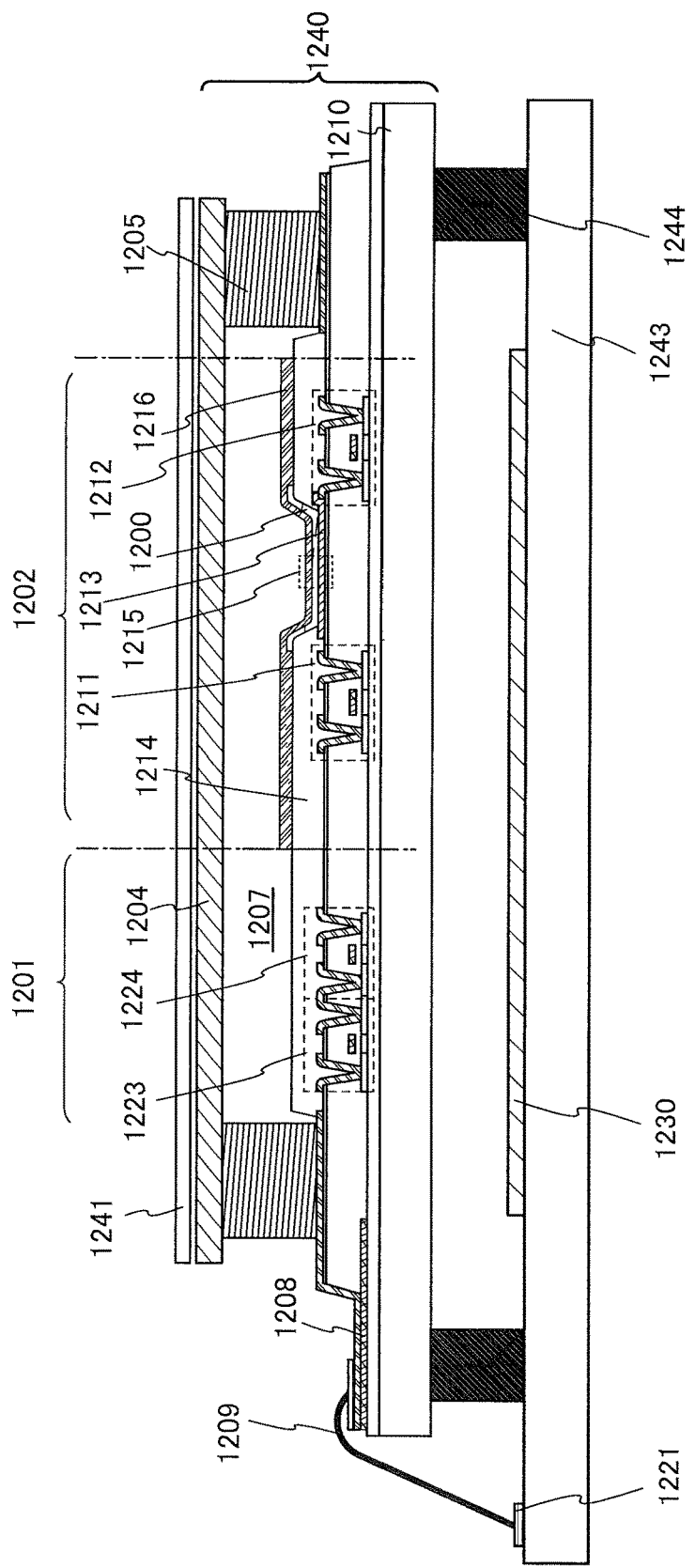
FIG. 9 illustrates an example of a display device according to one embodiment of the present invention.

In FIG. 9, an example of an active matrix display device provided with a light-emitting element on a display panel is illustrated. The display device illustrated in FIG. 9 includes a display panel 1240, a touch sensor portion 1241, a support 1243, and an elastic member 1244. The display panel 1240 includes a pixel portion 1202 and a driver circuit portion (a signal line driver circuit or a scan line driver circuit) 1201 provided over an element substrate 1210. The pixel portion 1202 and the driver circuit portion 1201 are sealed between the element substrate 1210 and a sealing substrate 1204 with a sealing material 1205.

Over the element substrate 1210, a lead wiring 1208 for connecting an external input terminal is provided through which an external signal (e.g., a video signal, a clock signal, a start signal, a reset signal, or the like) or a potential is transmitted to the driver circuit portion 1201. Here, an example in which the driver circuit portion 1201 and a logic circuit 1230 are connected by a wire bonding method using a wiring 1209 is described.

An example is illustrated in which a CMOS circuit that is the combination of an n-channel TFT 1223 and a p-channel TFT 1224 is formed in the driver circuit portion 1201. Note that a circuit included in the driver circuit portion may be formed using various CMOS circuits, PMOS circuits, or NMOS circuits. Although this embodiment describes a driver-integrated type in which the driver circuit is formed over the substrate, this embodiment is not limited to this. The driver circuit can be formed on the support 1243 instead of over the substrate.

The pixel portion 1202 includes a plurality of pixels, each of which includes a switching TFT 1211, a current-controlling TFT 1212, and a first electrode 1213 which is electrically connected to a wiring (a source electrode or a drain electrode) of the current-controlling TFT 1212. Note that an insulator 1214 is formed to cover an end portion of the first electrode 1213. Here, the insulator 1214 is formed using a positive photosensitive acrylic resin.

The insulator 1214 is preferably formed so as to have a curved surface with curvature at an upper end portion or a lower end portion thereof in order to obtain favorable coverage by a film which is to be stacked over the insulator 1214. For example, in the case of using a positive photosensitive acrylic resin as a material for the insulator 1214, the insulator 1214 is preferably formed so as to have a curved surface with a curvature radius (0.2 µm to 3 µm) at the upper end portion thereof. Either a negative photosensitive material or a positive photosensitive material can be used for the insulator 1214. Without limitation to an organic compound, an inorganic compound, for example, silicon oxide, silicon oxynitride, or the like can be used for the insulator 1214.

An EL layer 1200 and a second electrode 1216 are stacked over the first electrode 1213. Note that when an indium tin oxide (ITO) film is used as the first electrode 1213, and a stacked film of a titanium nitride film and a film containing aluminum as its main component or a stacked film of a titanium nitride film, a film containing aluminum as its main component, and a titanium nitride film is used as the wiring of the current-controlling TFT 1212 which is connected to the first electrode 1213, resistance of the wiring is low and favorable ohmic contact with the ITO film can be obtained.

In the EL layer 1200, at least a light-emitting layer is provided, and in addition to the light-emitting layer, a hole-injecting layer, a hole-transporting layer, an electron-transporting layer, or an electron-injecting layer is provided as appropriate. The first electrode 1213, the EL layer 1200, and the second electrode 1216 are stacked, whereby a light-emitting element 1215 is formed.

Although the cross-sectional view of FIG. 9 illustrates only one light-emitting element 1215, a plurality of light-emitting elements is arranged in matrix in the pixel portion 1202. Light-emitting elements which provide three kinds of light emissions (R, G, and B) are selectively formed in the pixel portion 1202, whereby a light-emitting device which is capable of full color display can be manufactured. Alternatively, a light-emitting device which is capable of full color display may be manufactured by a combination with color filters.

Furthermore, the sealing substrate 1204 and the element substrate 1210 are attached to each other with the sealing material 1205, whereby the light-emitting element 1215 is provided in a space 1207 surrounded by the element substrate 1210, the sealing substrate 1204, and the sealing material 1205. Note that there is also the case where the space 1207 is filled with the sealing material 1205 as well as an inert gas (such as nitrogen or argon).

Note that an epoxy resin is preferably used for the sealing material 1205. In addition, it is preferable that the material do not transmit moisture and oxygen as much as possible. As the sealing substrate 1204, a plastic substrate formed using fiberglass-reinforced plastics (FRP), polyvinyl fluoride (PVF), polyester, acrylic, or the like can be used instead of a glass substrate or a quartz substrate.

The wiring 1209 is electrically connected to the logic circuit 1230 through an electrode pad 1221.

The logic circuit 1230 is provided with one or more circuits selected from a CPU, a register, a decoder, a counter, a frequency-divider circuit, a memory, a control circuit, a timing generator (a timing generating circuit), a SRAM, a DRAM, an image processing circuit, an interface circuit connected to an external device, a graphics accelerator, a mask ROM, and a DSP.

The display device illustrated in FIG. 9 preferably has a top-emission structure in which light is emitted from the sealing substrate 1204 side.

In the display device in FIG. 9, when a self-luminous light-emitting element is used for the display panel, luminance does not decrease or display is not interrupted; therefore, the support can be provided with the logic circuit or the like. Accordingly, a logic circuit does not need to be provided over the element substrate 1210 and a frame of the pixel portion can be narrowed. Further, the support can be effectively utilized, and a layout can be reduced.

Note that the driver circuit portion 1201 is formed over the element substrate in FIG. 9; however, the driver circuit portion 1201 may be formed over the support 1243. Accordingly, the frame of the pixel portion can be further narrowed.

Instead of the wiring 1209, the lead wiring 1208 may be connected to a flexible printed circuit (FPC) via an anisotropic conductive film (ACF). In that case, a printed wiring board (PWB) may be attached to the FPC and the printed wiring board may be used as the support.

As illustrated in FIGS. 1B and 2A, the structure in which the elastic members are provided at the end portions of the display panel is suitable for a small-sized panel which is greater than or equal to 1 inch and less than or equal to 6 inches, particularly, greater than or equal to 2 inches and less than or equal to 5 inches. This is because tactile feedback feeling can be sufficiently obtained even when light force is applied.

As illustrated in FIGS. 2B and 2C, a structure in which the elastic member is provided at the periphery of the pixel portion included in the display panel is suitable for a middle-sized panel which is greater than or equal to 7 inches and less than or equal to 12 inches, particular, greater than or equal to 8 inches and less than or equal to 11 inches. This is because the structure can withstand a certain amount of weight of the panel and play a role as a cushion. In addition, the structure can provide a further sense of stability as compared with the structures illustrated in FIGS. 1B and 2A.

As illustrated in FIG. 2D, a structure in which the elastic member is arranged in matrix is suitable for a large-sized panel which is greater than or equal to 12 inches (e.g., less than or equal to 50 inches). This is because, in the large-sized panel which is greater than or equal to 12 inches, its self weight can be supported and input feeling with favorable uniformity can be obtained. Note that in accordance with the size of the panel, the number of elastic members which are arranged longitudinally and horizontally may be increased or decreased.

As the surface area of the elastic member increases, the drop durability of the display device can be improved.

The display device may be formed in such a manner that the elastic member 104 is provided on the display panel 102 side and then bonded to the support 103, or in such a manner that the elastic member 104 is provided on the support 103 side and then bonded to the display panel 102.

As one characteristic of this structure, the elastic member is provided on the back of the display panel so as to overlap with the display panel. The elastic member 104 is provided below the display panel 102, so that the touch sensor portion 101 works with the display panel 102 at the time of operating the touch sensor portion. Therefore, variation of a distance between the touch sensor portion and the display panel can be eliminated or suppressed, and a high-definition image can be maintained at the time of operating the touch sensor portion.

On the other hand, when a columnar spacer or a click member having a complex structure for obtaining input feeling is provided in the touch sensor portion, an image is displayed through the columnar spacer or the click member, and image quality is deteriorated, which is unfavorable. In addition, the width of the touch sensor portion should be increased to some extent to provide the columnar spacer or the click member, and when an image displayed on the display panel is displayed through the touch sensor portion, an influence of interference or refraction of light easily occurs, and image quality is unfavorable. On the other hand, according to one embodiment of the present invention, the elastic member is provided below the display panel; therefore, variation of a distance between the touch sensor portion and the display panel can be eliminated or suppressed, and a high-definition image can be maintained.

A structure can be used, in which the elastic member is provided between the touch sensor portion and the support and the elastic member expands and contracts independently from the display panel, so that input feeling can be obtained. However, in the structure, a longer distance between the touch sensor portion and the display panel is necessary to some extent so that the touch sensor portion is not in contact with a display panel portion; therefore, an influence of interference or refraction of light between the touch sensor portion and the display panel easily occurs. On the other hand, according to one embodiment of the present invention, the elastic member is provided below the display panel; therefore, variation of a distance between the touch sensor portion and the display panel can be eliminated or suppressed, and a high-definition image can be maintained.

Figure 3A:
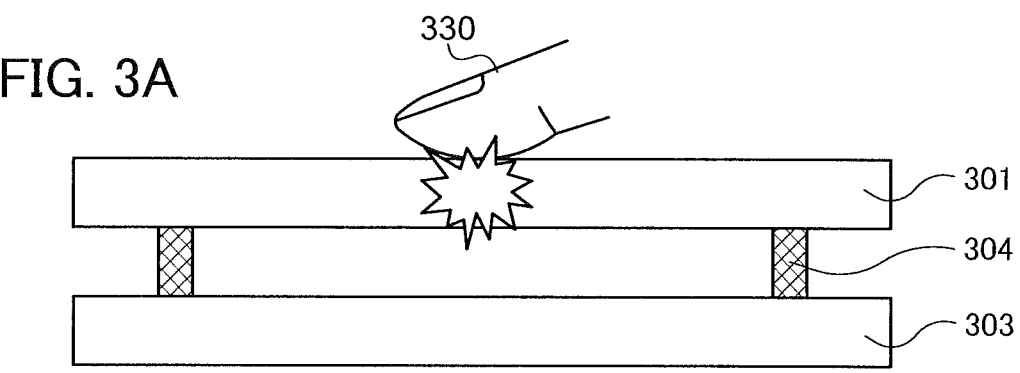
FIGS. 3A and 3B illustrate an example of a display device according to one embodiment of the present invention.
Figure 3B:
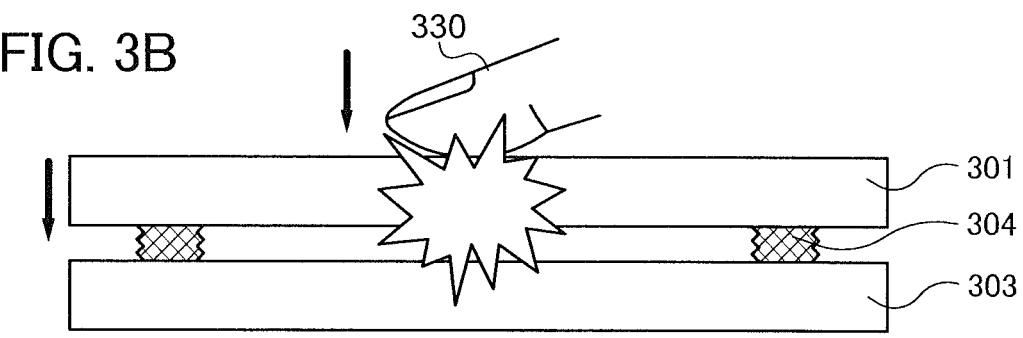

Next, a display device including an optical touch sensor is illustrated in FIGS. 3A and 3B. In FIGS. 3A and 3B, a touch sensor is incorporated into a display panel, and the display panel having the touch sensor is collectively called a touch panel. In a pixel of a touch panel 301, a photosensor (also referred to as a photoelectric conversion element) that can sense or detect light is incorporated. An elastic member 304 is provided between the touch panel 301 and a support 303. A backlight unit is used for the support 303.

FIG. 3A illustrates a mode in which a finger which is an object to be detected 330 slightly touches the touch panel 301.

In the optical touch panel, light is emitted from the touch panel 301. In the case where the object to be detected 330 exists at a given position of the touch panel 301, light at the region where the object to be detected 330 exists is blocked by the object to be detected 330, and part of light is reflected. The light reflected is sensed or detected by the photosensor, whereby it can be recognized that the object to be detected 330 exists in the region sensed.

FIG. 3B illustrates a mode in which the finger which is the object to be detected 330 presses the touch panel 301. By the press, the elastic member contracts, so that input feeling is obtained, and the touch panel 301 comes close to the support 303 which is a backlight unit, so that light reflected by the object to be detected 330 is changed. Accordingly, the variation of light is added to detection treatment, so that recognition accuracy can be improved.

The display device according to this embodiment can obtain input feeling because the elastic member contracts when the touch sensor portion is pressed. In addition, since the elastic member is arranged below the display panel, deterioration of image quality due to the elastic member over the display panel can be suppressed. Accordingly, a high-definition display device can be provided.

Embodiment 2

In this embodiment, a detailed structure of part of the display device described in Embodiment 1 will be described with reference to FIG. 4. In this embodiment, an example, in which a liquid crystal element is used for a display panel and a backlight unit is used for a support, is described.

A touch sensor portion 401 is provided over a display panel 402. A backlight unit 403 is provided below the display panel 402. An elastic member 404 is provided between the display panel 402 and the backlight unit 403. As the elastic member, a urethane sponge, rubber, cushion tape, a spring, or the like can be used. Here, an example in which a urethane sponge is used is described.

The display panel 402 includes a polarizing film 410, a first substrate 411, a second substrate 412, a transistor 413, a first electrode 414, a second electrode 415, an alignment film 440, an alignment film 416, a liquid crystal 417, a spacer 418, a sealing material 419, a color filter 420, a polarizing film 421, a wide view film 423, a black matrix 424, a capacitor 425, and the like.

The transistor 413 and the capacitor 425 are formed over the first substrate 411. The first electrode 414 is electrically connected to one of a source and a drain of the transistor 413. The second substrate 412 which is a counter substrate is provided with the color filter 420, the black matrix 424, the second electrode 415 which is a counter electrode, the alignment film 416, and the like. The color filter 420 can be provided on the first substrate 411 side as well. Alternatively, the counter electrode can be provided on the first electrode 414 side, so that an IPS liquid crystal module can be formed. Note that the capacitor 425 is not necessarily provided.

The second substrate 412 faces and is fixed to the first substrate 411 with the sealing material 419. The spacer 418 is provided to control a distance (cell gap) between the first substrate 411 and the second substrate 412, and the gap held by the spacer 418 is filled with the liquid crystal 417. A spherical spacer or a columnar spacer can be used for the spacer.

As a material of the liquid crystal 417, a lyotropic liquid crystal, a thermotropic liquid crystal, a low molecular liquid crystal, a high molecular liquid crystal, a discotic liquid crystal, a ferroelectric liquid crystal, an anti-ferroelectric liquid crystal, or the like is used. The above liquid crystal materials exhibit a nematic phase, a cholesteric phase, a cholesteric blue phase, a smectic phase, a smectic blue phase, a cubic phase, a smectic D phase, a chiral nematic phase, an isotropic phase, or the like depending on conditions. A cholesteric blue phase and a smectic blue phase are seen in a liquid crystal material having a cholesteric phase or a smectic phase with a relatively short helical pitch of less than or equal to 500 nm. The alignment of the liquid crystal material has a double twist structure. Having the order of less than or equal to an optical wavelength, the liquid crystal material is transparent, and optical modulation action is generated through a change in alignment order by voltage application. A blue phase is optically isotropic and thus has no viewing angle dependence. Thus, an alignment film is not necessarily formed; therefore, display image quality can be improved and cost can be reduced.

As the backlight unit 403, an edge-light type backlight unit or a direct type backlight unit can be used. In this embodiment, an example in which an edge-light type backlight unit is used is described. The backlight unit 403 includes an edge light 428, a light guide plate 429, a reflection plate 430, a prism sheet 431, a diffuser plate 432, and the like. As a light source of the edge light 428, a cold cathode fluorescent lamp, an LED, or the like can be used.

Although the elastic member 404 is formed between the backlight unit 403 and the display panel 402, the elastic member 404 may be provided not between the backlight unit 403 and the display panel 402 but below the backlight unit 403. Alternatively, the elastic members 404 may be provided between the backlight unit 403 and the display panel 402 and below the backlight unit 403. When the elastic member 404 is provided below the backlight unit 403, a second support is further provided so that the elastic member is sandwiched between the second support and the backlight unit 403.

Although the polarizing film 410 is provided between the first substrate 411 and the elastic member 404, the polarizing film 410 can be provided between the backlight unit 403 and the elastic member 404.

For the touch sensor portion 401, a resistive film sensor element, a capacitive sensor element, an electromagnetic induction sensor element, or an optical sensor element can be used.

Figure 4:
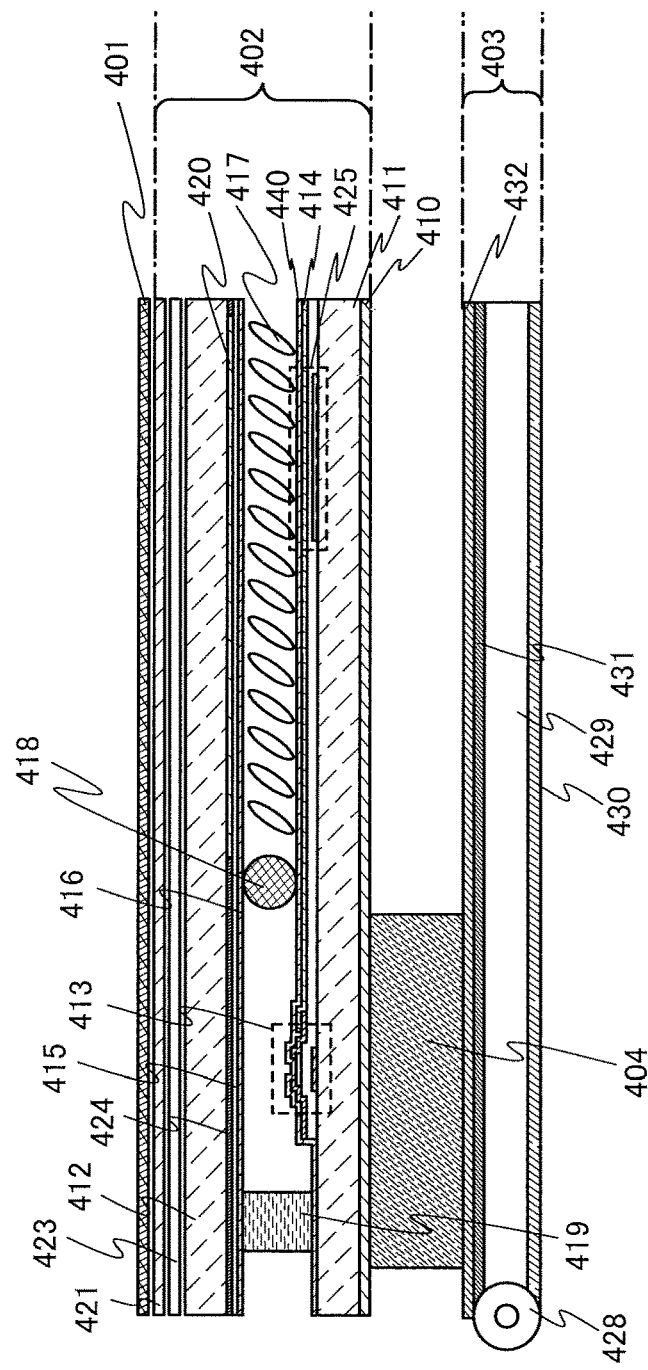
FIG. 4 illustrates an example of a liquid crystal display device according to one embodiment of the present invention.

In FIG. 4, when the touch sensor portion 401 is pressed, the elastic member 404 contracts, so that comfortable input feeling can be obtained. In addition, since the elastic member 404 and the display panel 402 overlap with each other and are provided below the touch sensor portion 401, there is no foreign material between the touch sensor portion and the display panel, and the touch sensor portion works with the display panel and sinks. Therefore, deterioration of image quality due to variation of a distance between the touch sensor portion and the display panel can be suppressed. Accordingly, a high-definition liquid crystal display device can be provided.

Note that in the case where an optical sensor element is used for the touch sensor portion 401, when the touch sensor portion 401 is pressed, the elastic member 404 sinks and the touch sensor portion 401 and the display panel 402 come close to the backlight unit 403, whereby light reflected by an object to be detected is changed. Accordingly, the variation of light is added to detection treatment, so that recognition accuracy can be improved. Note that a touch sensor (photosensor) provided in the touch sensor portion 401 can be provided in each pixel of the display panel 402.

Next, an example of cross-sectional structures of a transistor and a capacitor which can be used for the display panel 402 in this embodiment are described with reference to FIGS. 5A to 5D. A bottom-gate transistor and a capacitor are illustrated in each of FIGS. 5A to 5C, while a top-gate transistor and a capacitor are illustrated in FIG. 5D.

Figure 5A:
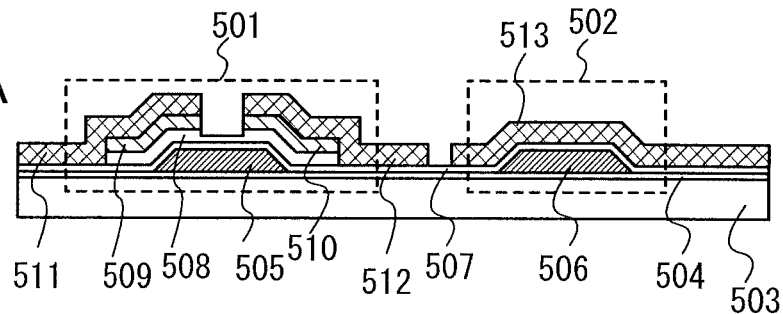
FIGS. 5A to 5D each illustrate an example of a transistor according to one embodiment of the present invention.

A transistor 501 illustrated in FIG. 5A has an inverted staggered (bottom-gate) structure, particularly, a structure called a channel-etched structure.

A first insulating film (an insulating film 504) is formed over a substrate 503. As the substrate 503, a plastic substrate having sufficient heat resistance to withstand a processing temperature of a transistor as well as a glass substrate manufactured by a fusion method or a float method, such as a substrate of barium borosilicate glass, aluminoborosilicate glass, or aluminosilicate glass, a ceramic substrate, or the like can be used. Alternatively, a metal substrate such as a stainless steel alloy substrate which is provided with an insulating film on the surface may also be used.

The first insulating film can be formed using a single layer or a stack of a silicon oxide film, a silicon nitride film, a silicon oxynitride film, and/or a silicon nitride oxide film by a CVD method, a sputtering method, or the like. The first insulating film can have a function of a base film that can prevent impurities from the substrate side from adversely affecting a semiconductor layer and changing characteristics of the transistor. In particular, the silicon nitride film is dense and has high barrier properties, so that the first insulating film preferably contains silicon nitride. Note that the first insulating film is not necessarily formed. When the first insulating film is not formed, reduction in the number of steps and manufacturing costs and increase in yield can be realized.

First conductive layers (conductive layers 505 and 506) are formed over the first insulating film. The conductive layer 505 includes a portion functioning as a gate electrode of the transistor 501. The conductive layer 506 includes a portion functioning as a first electrode of a capacitor 502. As the first conductive layers, a metal or a semiconductor material, such as Ti, Mo, Ta, Cr, W, Al, Nd, Cu, Ag, Au, Pt, Nb, Si, Zn, Fe, Ba, or Ge; or an alloy material of these elements can be used. Alternatively, a stack including any of these elements (including an alloy thereof) can be used.

The first conductive layers can be formed as follows: a conductive film is formed over the first insulating film by a sputtering method or a vacuum evaporation method, a mask is formed over the conductive film by a photolithography technique or an inkjet method, and the conductive film is etched using the mask. Alternatively, the first conductive layers may be formed by discharging a conductive nanopaste of silver, gold, copper, or the like by an inkjet method and baking the conductive nanopaste.

Note that as barrier metal which increases adhesion of the first conductive layers and prevents diffusion to the substrate 503 or the insulating film 504, a nitride film of any of the above-described metal materials may be provided between the insulating film 504 and the first conductive layers. Further, the first conductive layers may have either a single-layer structure or a stacked structure. For example, a stack can be used, in which a molybdenum film and an aluminum film, a molybdenum film and an alloy film of aluminum and neodymium, a titanium film and an aluminum film, or a titanium film, an aluminum film, and a titanium film are stacked from the substrate 503 side.

A second insulating film (an insulating film 507) is formed so as to cover at least the first conductive layers. The second insulating film serves as a gate insulating film. As the second insulating film, a single layer or a stack of a silicon oxide film, a silicon nitride film, a silicon oxynitride (Si$O_xN_y$) film, and/or a silicon nitride oxide film (SiN$_x$O$_y$) can be used.

Here, a silicon oxynitride film means a film that contains more oxygen than nitrogen and contains oxygen, nitrogen, silicon, and hydrogen at concentrations ranging from 55 at. % to 65 at. %, 1 at. % to 20 at. %, 25 at. % to 35 at. %, and 0.1 at. % to 10 at. %, respectively. Further, a silicon nitride oxide film means a film that contains more nitrogen than oxygen and includes oxygen, nitrogen, silicon, and hydrogen at concentrations ranging from 15 at. % to 30 at. %, 20 at. % to 35 at. %, 25 at % to 35 at. %, and 15 at. % to 25 at. %, respectively.

Alternatively, the second insulating film may be formed using one kind of oxide, nitride, oxynitride, and nitride oxide of aluminum, yttrium, magnesium, or hafnium; or a compound including at least two or more kinds of the above.

A first semiconductor layer (a semiconductor layer 508), second semiconductor layers (semiconductor layers 509 and 510), second conductive layers (conductive layers 511 and 512) are formed over the second insulating film which overlaps with the conductive layer 505. A second conductive layer (a conductive layer 513) is formed over the second insulating film which overlaps with the conductive layer 506.

The semiconductor layer 508 is formed by a photolithography method, an ink-jet method, a printing method, or the like. Part of the semiconductor layer 508 is formed to extend to a portion which is over the insulating film 507 and which does not overlap with the conductive layer 505. The semiconductor layer 508 includes a portion functioning as a channel region of the transistor 501. Note that as the semiconductor layer 508, non-crystalline semiconductor such as amorphous silicon (a-Si:H) or the like, microcrystalline silicon (μ-Si:H), polycrystalline silicon, single crystal silicon, a compound semiconductor such as gallium arsenide (GaAs) or the like, or an oxide semiconductor, such as zinc oxide (ZnO), an In—Ga—Zn—O-based oxide semiconductor, or the like can be used.

The use of amorphous silicon (a-Si:H) or microcrystalline silicon for semiconductor layers of transistors has advantages of high uniformity of characteristics of the transistors and low manufacturing costs, and is particularly effective in manufacturing transistors over a large substrate with a diagonal of more than 500 mm.

When polycrystalline silicon is used as the semiconductor layer, there is an advantage in that a transistor has high mobility and manufacturing costs are low. Moreover, since little deterioration in characteristics over time occurs, a high reliable device can be obtained.

When oxide semiconductor is used as the semiconductor layer, field effect mobility can be higher than that of a transistor using amorphous silicon. The oxide semiconductor film can be formed by a sputtering method or the like at a temperature lower than or equal to 300° C. Its manufacturing process is easier than that of a transistor using polycrystalline silicon.

Note that as an example of an oxide semiconductor which can be used in this specification, there is an oxide semiconductor referred to as $InMO_3 (ZnO)_m$ (m>0). Here, M denotes one or more of metal elements selected from gallium (Ga), iron (Fe), nickel (Ni), manganese (Mn), and cobalt (Co). For example, the case where Ga is selected as M includes not only the case where only Ga is contained as M but also the case where Ga and the above metal element other than Ga, for example, Ga and Ni or Ga and Fe are contained as M. Moreover, in the oxide semiconductor, in some cases, a transition metal element such as Fe or Ni or oxide of the transition metal is contained as an impurity element in addition to a metal element contained as M. In this specification, of the oxide semiconductors, an oxide semiconductor including at least gallium as M is referred to as an In—Ga—Zn—O-based oxide semiconductor, and a thin film using the material is referred to as an In—Ga—Zn—O-based non-single-crystal film.

Note that for a portion of the second insulating film, which is in contact with the semiconductor layer 508, a silicon oxide film is preferably used. This is because the trap levels at the interface between the semiconductor layer 508 and the second insulating film can be reduced.

When the second insulating film is in contact with Mo, a silicon oxide film is preferably used as the second insulating film in contact with Mo. This is because the silicon oxide film does not oxidize Mo.

Of the second semiconductor layers, the semiconductor layer 509 includes a portion functioning as one of a source and a drain. The semiconductor layer 510 includes a portion functioning as the other of the source and the drain. Note that as the second semiconductor layers, silicon including phosphorus or the like, a semiconductor material having higher conductivity than the first semiconductor layer, an oxide semiconductor having higher carrier concentration than the first semiconductor layer, or the like can be used. The second semiconductor layers each can be referred to as a buffer layer or an n⁺ layer depending on its function.

Of the second conductive layers, the conductive layer 511 includes a portion functioning as one of a source and a drain of the transistor 501. The conductive layer 512 includes a portion functioning as the other of the source and the drain of the transistor 501. The conductive layer 513 includes a portion functioning as a second electrode of the capacitor 502. As the second conductive layers, a metal or a semiconductor material, such as Ti, Mo, Ta, Cr, W, Al, Nd, Cu, Ag, Au, Pt, Nb, Si, Zn, Fe, Ba, or Ge; or an alloy material of these elements can be used. Alternatively, a stack including any of these elements (including an alloy thereof) can be used.

Note that in steps after the second conductive layers are formed, a variety of insulating films or conductive films may be formed. For example, an insulating film may be formed as a protective film over the transistor. Note that the protective film is provided to prevent entry of impurities floating in air, such as an organic substance, a metal substance, or moisture, and is preferably a dense film. For example, a silicon oxide film and a silicon nitride film may be stacked as the protective film over the transistor 501.

Note that in steps of manufacturing a channel-etched transistor, the first semiconductor layer and the second semiconductor layers can be continuously formed. In addition, the first semiconductor layer and the second semiconductor layers can be formed using the same mask.

After the second conductive layers are formed, part of the second semiconductor layers are removed using the second conductive layers as a mask or using a mask used for the second conductive layers, whereby the channel region of the transistor can be formed. Accordingly, it is not necessary to use an additional mask that is used only for removing part of the second semiconductor layers; thus, a manufacturing process can be simplified, and manufacturing costs can be reduced. Here, the first semiconductor layer below the removed second semiconductor layers serves as the channel region of the transistor.

Figure 5B:
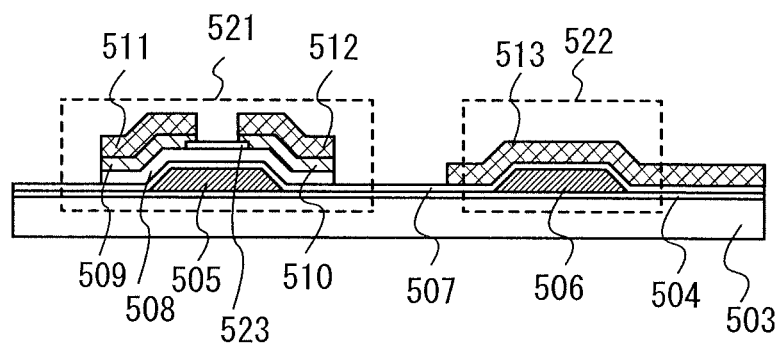

FIG. 5B illustrates cross-sectional structures of an inverted staggered (bottom gate) transistor and a capacitor. In particular, the transistor illustrated in FIG. 5B has a channel protection (etch stop) structure.

Portions different from those in FIG. 5A are described.

A third insulating film (an insulating film 523) is formed over part of a first semiconductor layer (the semiconductor layer 508). The insulating film 523 prevents the channel region of a transistor 521 from being removed by etching. That is, the insulating film 523 functions as a channel protection film (an etch stop film). As the third insulating film, a single layer or a stack of a silicon oxide film, a silicon nitride film, a silicon oxynitride film ($SiO_xN_y$), and/or the like can be used.

The second semiconductor layers (the semiconductor layers 509 and 510) and the second conductive layers (the conductive layers 511 and 512) are formed over part of the first semiconductor layer and part of the third insulating film.

The first semiconductor layer and the second semiconductor layers can be processed into desired shapes illustrated in FIG. 5B using the same mask as the mask which is used for patterning (processing) the second conductive layers or using the second conductive layers which are patterned as a mask. This makes it possible to reduce the number of steps.

Figure 5C:
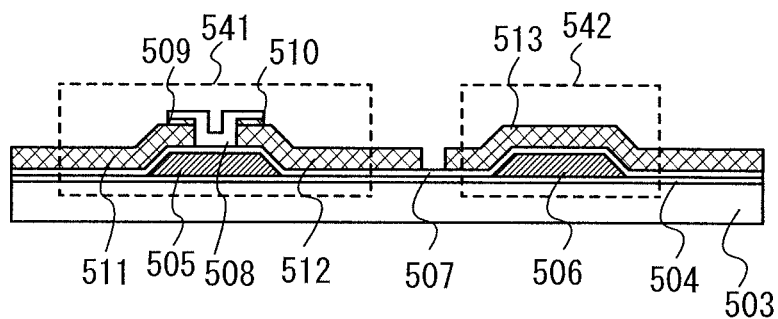
Figure 5D:
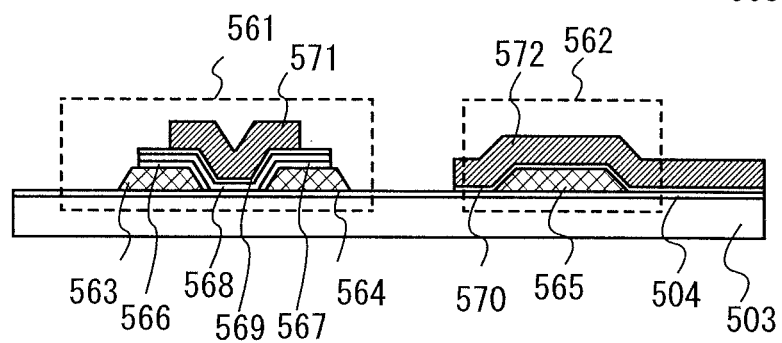

FIG. 5C illustrates cross-sectional structures of a bottom-gate transistor and a capacitor. In particular, the transistor illustrated in FIG. 5C has a bottom-contact structure.

A transistor 541 includes the first conductive layer (the conductive layer 505), the second insulating film (the insulating film 507), the second conductive layers (the conductive layers 511 and 512), the second semiconductor layers (the semiconductor layers 509 and 510), and the first semiconductor layer (the semiconductor layer 508). The first conductive layer (the conductive layer 505) is provided over the substrate 503 over which the first insulating film (the insulating film 504) is formed. The second insulating film (the insulating film 507) is provided over the conductive layer 505. The second conductive layers (the conductive layers 511 and 512) are over the insulating film 507, partly overlap with the conductive layer 505, and are partly provided to extend to a region which does not overlap with the conductive layer 505. The second semiconductor layers (the semiconductor layers 509 and 510) are provided over the second conductive layers. The first semiconductor layer (the semiconductor layer 508) is provided over the second semiconductor layers and between the conductive layer 511 and the conductive layer 512.

The first conductive layer (the conductive layer 505) includes a portion functioning as a gate electrode of the transistor. The second insulating film (the insulating film 507) includes a portion functioning as a gate insulating film. Of the second conductive layers, the conductive layer 511 includes a portion functioning as one of a source and a drain, while the conductive layer 512 includes a portion functioning as the other of the source and the drain. The second semiconductor layers have higher conductivity than the first semiconductor layer. Of the second semiconductor layers, the semiconductor layer 509 includes a portion functioning as one of the source and the drain, while the semiconductor layer 510 includes a portion functioning as the other of the source and the drain. The first semiconductor layer 508 includes a portion functioning as a channel.

A capacitor 542 includes the first conductive layer (the conductive layer 506) over the first insulating film and the second conductive layer (the conductive layer 513) which overlaps with the conductive layer 506 with the second insulating film (the insulating film 507) interposed therebetween.

The conductive layer 506 and the conductive layer 513 each include a portion functioning as an electrode.

The films and the layers can be formed using the materials or the like described in FIG. 5A.

FIG. 5D illustrates cross-sectional structures of a top-gate transistor and a capacitor.

A first insulating film (the insulating film 504) is formed over the substrate 503. As the substrate 503, a plastic substrate having sufficient heat resistance to withstand a processing temperature of a transistor as well as a non-alkaline glass substrate manufactured by a fusion method or a float method, such as a substrate of barium borosilicate glass, aluminoborosilicate glass, or aluminosilicate glass, a ceramic substrate, or the like can be used. Alternatively, a metal substrate such as a stainless steel alloy substrate which is provided with an insulating film on the surface may also be used.

The first insulating film can be formed using a single layer or a stack of a silicon oxide film, a silicon nitride film, a silicon oxynitride film, and/or a silicon nitride oxide film by a CVD method, a sputtering method, or the like. The first insulating film can have a function of a base film that can prevent impurities from the substrate side from adversely affecting a semiconductor layer and changing characteristics of the transistor. In particular, the silicon nitride film is dense and has high barrier properties, so that the first insulating film preferably contains silicon nitride. Note that the first insulating film is not necessarily formed. When the first insulating film is not formed, reduction in the number of steps and manufacturing costs and increase in yield can be realized.

First conductive layers (a conductive layer 563, a conductive layer 564, and a conductive layer 565) are formed over the first insulating film. Of the first conductive layers, the conductive layer 563 includes a portion functioning as one of a source and a drain of a transistor 561. The conductive layer 564 includes a portion functioning as the other of the source and the drain of the transistor 561. The conductive layer 565 includes a portion functioning as a first electrode of a capacitor 562. As the first conductive layers, a metal or a semiconductor material, such as Ti, Mo, Ta, Cr, W, Al, Nd, Cu, Ag, Au, Pt, Nb, Si, Zn, Fe, Ba, or Ge; or an alloy material of these elements can be used. Alternatively, a stack including any of these elements (including an alloy thereof) can be used.

First semiconductor layers (semiconductor layers 566 and 567) are formed over the conductive layer 563 and the conductive layer 564. The semiconductor layer 566 includes a portion functioning as one of the source and the drain. The semiconductor layer 567 includes a portion functioning as the other of the source and the drain. Note that as the first semiconductor layers, silicon including phosphorus or the like, a semiconductor material having higher conductivity than a semiconductor layer in which a channel is formed, an oxide semiconductor having higher carrier concentration than the semiconductor layer in which the channel is formed, or the like can be used. The first semiconductor layers each can be referred to as a buffer layer, an n layer, a source region, or a drain region depending on its function.

A second semiconductor layer (a semiconductor layer 568) is formed over the first insulating film and between the conductive layer 563 and the conductive layer 564. Parts of the semiconductor layer 568 are formed to extend to regions over the conductive layer 563 and the conductive layer 564. The semiconductor layer 568 includes a portion functioning as a channel of the transistor 561. Note that as the semiconductor layer 568, non-crystalline semiconductor such as amorphous silicon (a-Si:H) or the like, microcrystalline silicon (p-Si:H), polycrystalline silicon, single crystal silicon, a compound semiconductor of gallium arsenide (GaAs) or the like, or an oxide semiconductor such as zinc oxide (ZnO), an In—Ga—Zn—O-based oxide semiconductor, or the like can be used.

Second insulating films (insulating films 569 and 570) are formed to cover at least the second semiconductor layer (the semiconductor layer 568) and the conductive layer 565. The insulating film 569 functions as a gate insulating film. As the second insulating films, a single layer or a stack of a silicon oxide film, a silicon nitride film, a silicon oxynitride film ($SiO_xN_y$), and/or the like can be used.

Second conductive layers (conductive layers 571 and 572) are formed over the second insulating films. The conductive layer 571 includes a portion functioning as a gate electrode of the transistor 561. The conductive layer 572 functions as a second electrode of the capacitor 562 or a wiring. As the second conductive layers, a metal or a semiconductor material, such as Ti, Mo, Ta, Cr, W, Al, Nd, Cu, Ag, Au, Pt, Nb, Si, Zn, Fe, Ba, or Ge; or an alloy material of these elements can be used. Alternatively, a stack including any of these elements (including an alloy thereof) can be used.

Note that in steps after the second conductive layers are formed, a variety of insulating films or conductive films may be formed.

Note that the first semiconductor layer may be formed between the conductive layer 565 and the insulating film 570 also.

In FIGS. 5A to 5D, the cross-sectional structures of the transistors and capacitors used for display panels are described; however, the capacitors are not necessarily provided. In addition, common portions of the transistors and capacitors may be formed by the same process or by different processes.

This embodiment can be combined with any of the other embodiments, as appropriate.

Embodiment 3

Figure 6A:
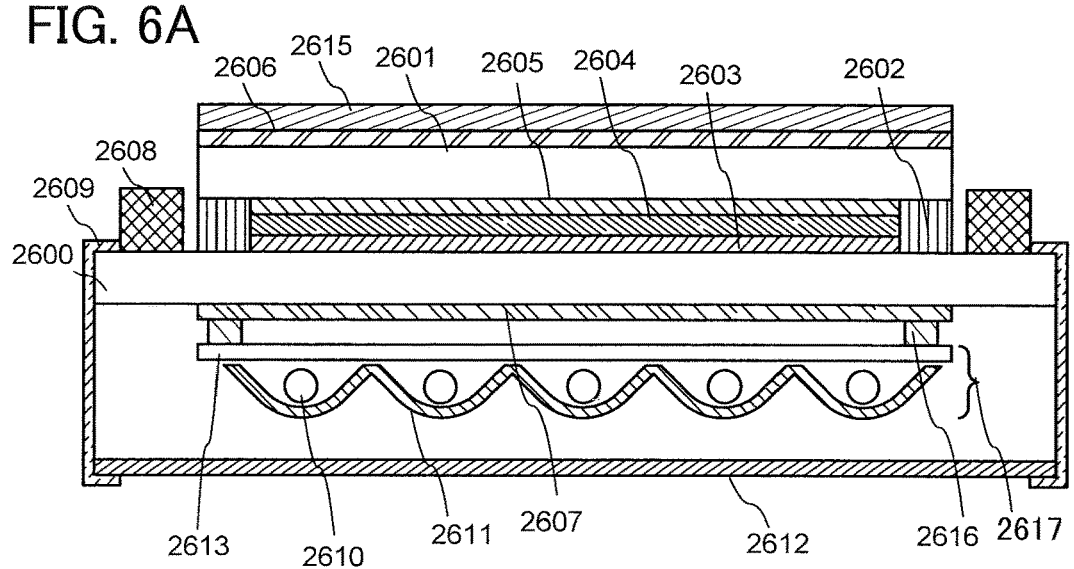
FIGS. 6A to 6C each illustrate an example of a display device according to one embodiment of the present invention.
Figure 6B:
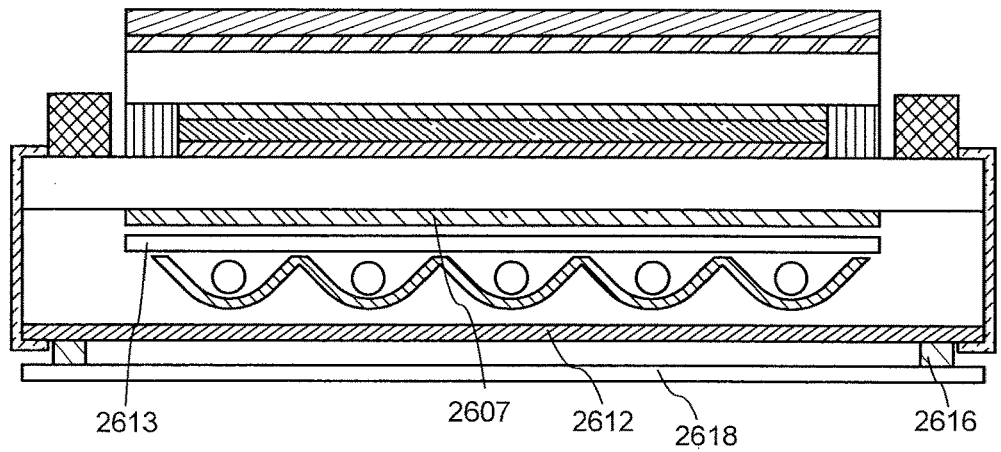
Figure 6C:
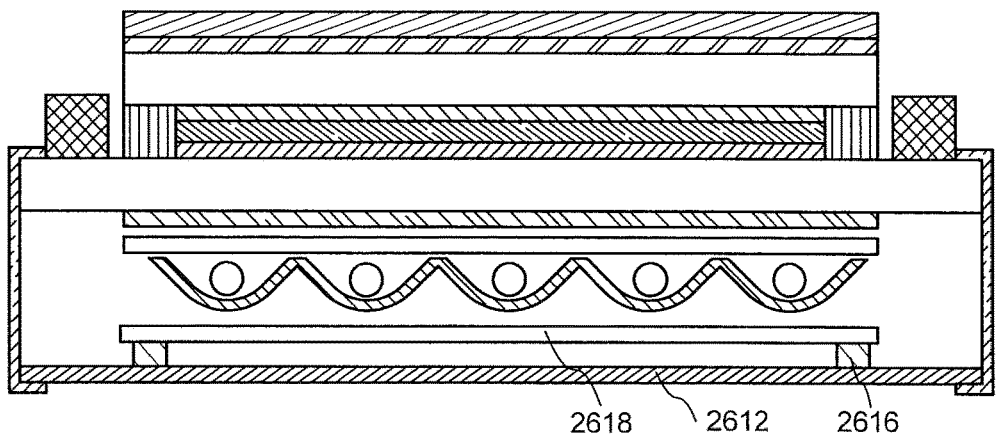

In this embodiment, one mode of a display device is illustrated in FIGS. 6A to 6C.

FIG. 6A illustrates an example of a liquid crystal display device, in which a first substrate 2600 and a second substrate 2601 which faces the first substrate are fixed to each other with a sealing material 2602, and a pixel portion 2603 including a transistor and the like, a display element 2604 including a liquid crystal layer, and a coloring layer 2605 are provided between the substrates to form a display region. The coloring layer 2605 is necessary to perform color display. In the case of the RGB system, respective coloring layers corresponding to colors of red, green, and blue are provided for respective pixels. A polarizing plate 2606 and a touch sensor portion 2615 are arranged on the outer side of the second substrate 2601, while a polarizing plate 2607 and a diffusion plate 2613 are arranged on the outer side of the first substrate 2600. A light source includes a cold cathode fluorescent lamp 2610 and a reflective plate 2611. A third substrate 2612 is connected to a wiring circuit portion 2608 of the first substrate 2600 through a flexible wiring board 2609 and includes external circuits such as a control circuit and a power source circuit. The polarizing plate and the liquid crystal layer may be stacked with a retardation film interposed therebetween. An elastic member 2616 is provided between the polarizing plate 2607 and the diffusion plate 2613. A backlight unit 2617 including the diffusion plate 2613, the cold cathode fluorescent lamp 2610, and the reflective plate 2611 is fixed to a housing which is not illustrated. When the touch sensor portion 2615 is pressed, the elastic member 2616 contracts, and the structure provided between the first substrate 2600 and the touch sensor portion 2615 sinks in accordance with the pressure, whereby input feeling can be obtained. The elastic member 2616 can be provided to overlap with the sealing material 2602 illustrated in FIG. 6A.

The liquid crystal display device can employ a TN (Twisted Nematic) mode, an IPS (In-Plane-Switching) mode, an FFS (Fringe Field Switching) mode, an MVA (Multi-domain Vertical Alignment) mode, a PVA (Patterned Vertical Alignment) mode, an ASM (Axially Symmetric aligned Micro-cell) mode, an OCB (Optical Compensated Birefringence) mode, an FLC (Ferroelectric Liquid Crystal) mode, an AFLC (Anti Ferroelectric Liquid Crystal) mode, or the like.

An example which has a structure different from the structure illustrated in FIG. 6A is illustrated in FIG. 6B.

A support 2618 is provided below the third substrate 2612, and the elastic member 2616 is provided between the support 2618 and the third substrate 2612.

When the touch sensor portion 2615 is pressed, the elastic member 2616 contracts in accordance with the pressure, so that input feeling can be obtained. The elastic member 2616 can be provided to overlap with the sealing material 2602 as illustrated in FIG. 6A.

An example which has a structure different from the structures illustrated in FIGS. 6A and 6B is illustrated in FIG. 6C The support 2618 is provided between the third substrate 2612 provided with an external circuit and the backlight unit 2617, and the elastic member 2616 is provided between the support 2618 and the third substrate 2612.

Note that in this embodiment, a cold cathode fluorescent lamp is used as the light source of the backlight; however, an LED can be used as a light source.

When the touch sensor portion 2615 is pressed, the elastic member 2616 contracts in accordance with the pressure with respect to the third substrate 2612 that is fixed, so that input feeling can be obtained.

As described above, input feeling can be obtained in the display device. In addition, deterioration of image quality can be suppressed. In FIG. 6A, when an optical photosensor is used for the touch sensor portion 2615, a photosensor comes close to the backlight unit 2617, so that light intensity can increase and recognition accuracy can be improved. The photosensor can be provided in the pixel portion 2603.

This embodiment can be combined with any of the other structures disclosed in other embodiments, as appropriate.

Embodiment 4

In this embodiment, a structure of a display device which is different from the structure described in Embodiment 1 will be described with reference to FIGS. 7A and 7B.

Figure 7A:
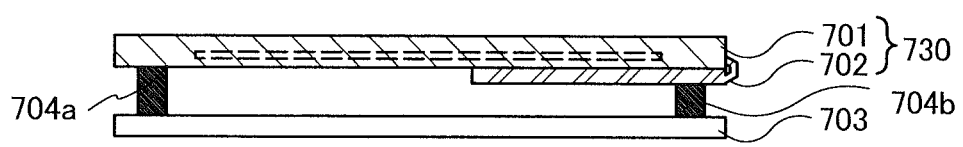
FIGS. 7A and 7B illustrate an example of a display device according to one embodiment of the present invention.
Figure 7B:
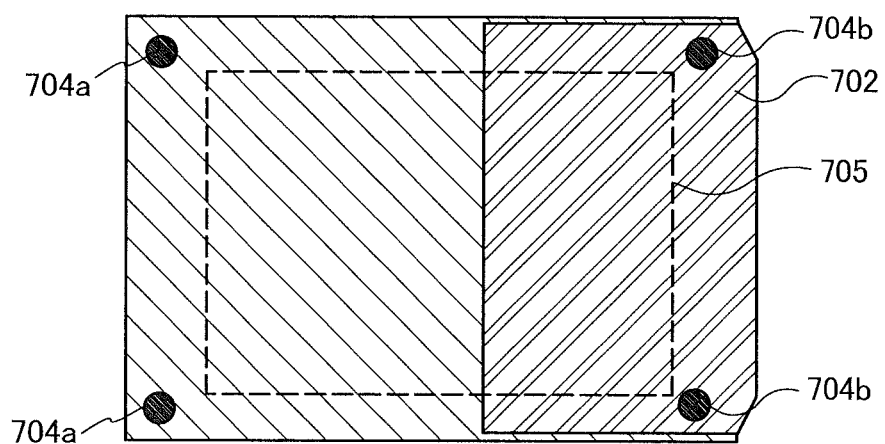

FIG. 7A illustrates a cross-sectional view of a display device, and FIG. 7B illustrates a rear view thereof.

A module 730 includes a panel 701 in which a display element is sealed and a flexible printed circuit (FPC) 702 in which an IC or the like including a controller is mounted on the panel. The FPC 702 is provided in an end product such as a mobile phone or a digital camera while the FPC 702 is folded on the back side of the panel 701. A support 703 is provided below the panel. An elastic member 704a is provided between the panel 701 and the support 703. An elastic member 704b is provided between the FPC and the support.

The panel 701 includes a display panel having a display element, and a touch sensor portion having a sensor function. Since the FPC 702 is folded on the back side of the panel 701 and an image is displayed on an upper surface of the panel 701, a light-emitting element is used for the display element. Alternatively, when a backlight which is not illustrated is provided between the panel 701 and the FPC 702, a liquid crystal display element can be used as the display element.

The height of the elastic member 704a is different from that of the elastic member 704b. The elastic member 704a is higher than the elastic member 704b, and the elastic members 704a and 704b are arranged over the support 703 and the height of each elastic member is set in such a manner that the panel is substantially parallel to the support.

When a light-emitting element is used as a display element, or when a liquid crystal element is used as a display element and an elastic member is arranged below a backlight unit, the elastic member may overlap with a pixel portion 705.

The elasticity of the elastic member 704a may differ from that of the elastic member 704b so that the amount of sinking of the whole panel is uniform when the panel is pressed. For example, the rate of expansion and contraction of the elastic member 704a is preferably higher than that of the elastic member 704b.

As the support, a housing (a back cover) or the like of an end product can be used.

The arrangement of the elastic members is not limited to FIG. 7A, and any of the structures illustrated in FIGS. 2A to 2D can be used as appropriate.

When the panel 701 is pressed, the elastic members 704a and 704b contract, so that input feeling can be obtained. In addition, the elastic members are arranged below the panel 701, so that deterioration of image quality can be suppressed. Accordingly, a high-definition display device can be provided.

The arrangement and shapes of the elastic members are changed as appropriate in accordance with the structure of the lower part of the panel, whereby a high-definition display device, in which input feeling can be obtained in accordance with the limitation of the layout even in a small-sized panel or the like, can be obtained.

This embodiment can be combined with any of the other structures disclosed in other embodiments, as appropriate.

Embodiment 5

In this embodiment, a structure of a display device which is different from the structures described in Embodiment 1 and Embodiment 4 will be described with reference to FIGS. 8A and 8B.

In this embodiment, an example in which elastic members are stacked is described.

Figure 8A:
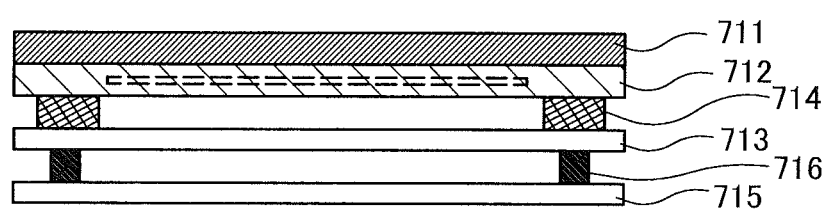
FIGS. 8A and 8B illustrate an example of a display device according to one embodiment of the present invention.
Figure 8B:
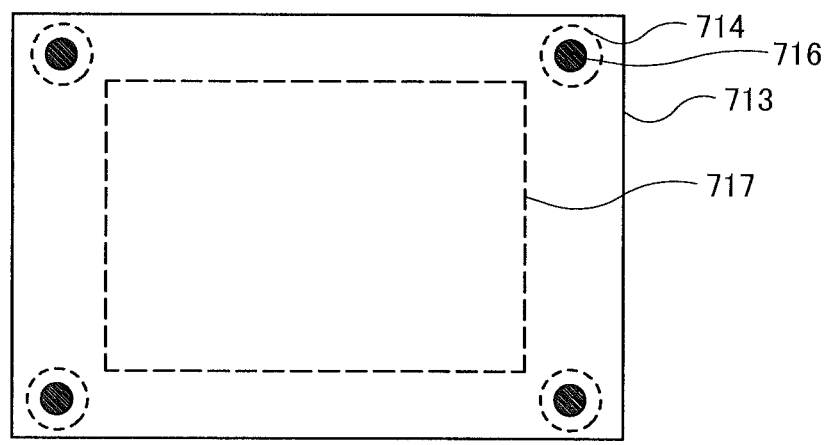

FIG. 8A illustrates a cross-sectional view of a display device, and FIG. 8B illustrates a rear view thereof.

A touch sensor portion 711 is provided over a display panel 712, and a first support 713 is provided below the display panel 712. A first elastic member 714 is provided between the display panel 712 and the first support 713. Further, a second support 715 is provided below the first support 713, and a second elastic member 716 is provided between the first support 713 and the second support 715.

The first elastic member 714 and the second elastic member 716 are provided at end portions of the display panel 712 as illustrated in FIGS. 8A and 8B. The first elastic member 714 and the second elastic member 716 are preferably provided so as not to overlap with a pixel portion 717 included in the display panel 712.

The elasticity of the first elastic member may differ from that of the second elastic member. For example, the elasticity of the second elastic member may be higher than that of the first elastic member, or the elasticity of the first elastic member may be higher than that of the second elastic member.

As the structures of the first elastic member and the second elastic member, any of the structures described in Embodiment 1 may be used. For example, when a backlight unit is used for the first support 713, the first elastic member 714 can be provided at an end portion of the display panel 712 so as not to overlap with the pixel portion 717, and the second elastic member 716 can be provided in matrix.

Even when one of the first elastic member and the second elastic member loses its elasticity due to the repeated press of the touch sensor portion, the other of the first elastic member and the second elastic member can expand and contract, so that a highly reliable display device in which input feeling can be obtained for a long period can be formed.

This embodiment can be combined with any of the other structures disclosed in other embodiments, as appropriate.

Embodiment 6

In this embodiment, examples of electronic devices each provided with the above-described display device will be described.

FIGS. 10A to 10G and FIGS. 11A to 11G are diagrams illustrating electronic devices. These electronic devices can each include a housing 5000, a display portion 5001, a speaker 5003, an LED lamp 5004, an operation key 5005, a connecting terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 5008, and the like.

Figure 10A:
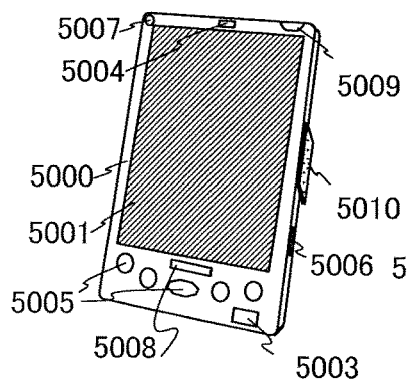
FIGS. 10A to 10G each illustrate an example of an electronic device according to one embodiment of the present invention.
Figure 10B:
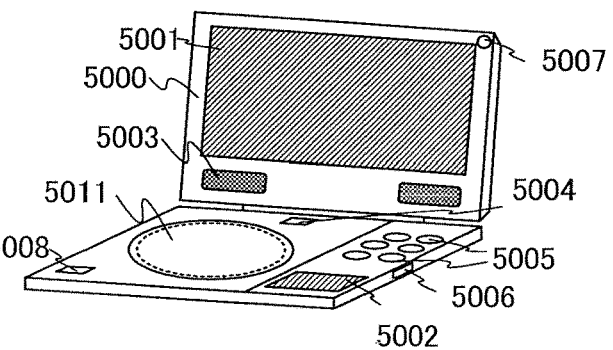
Figure 10C:
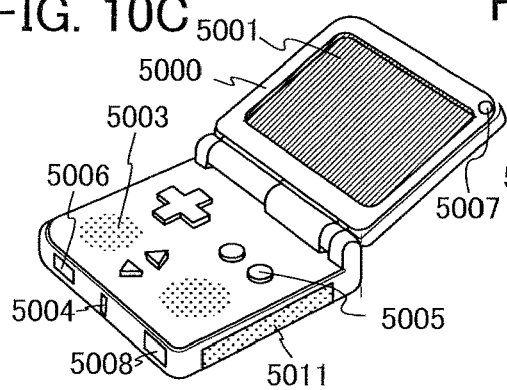
Figure 10D:
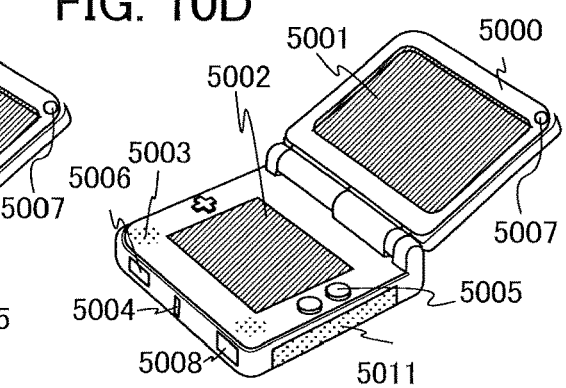
Figure 10E:
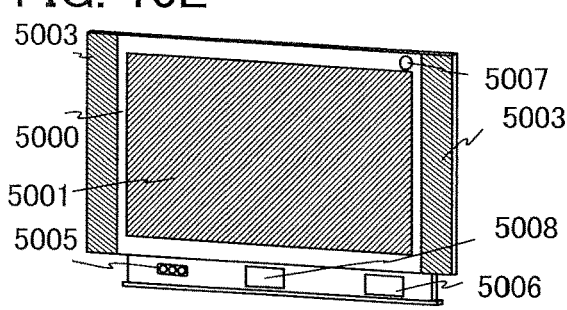
Figure 10F:
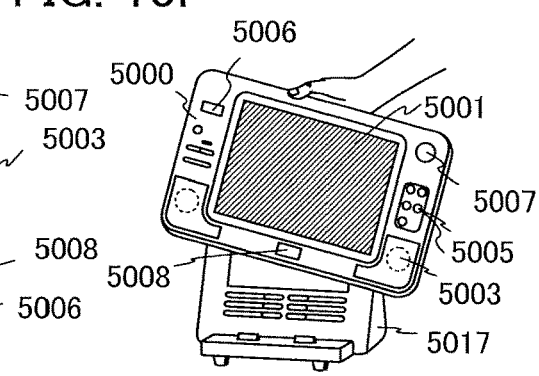
Figure 10G:
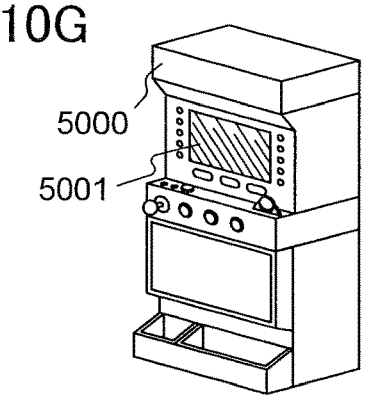

FIG. 10A illustrates a mobile computer which can include a switch 5009, an infrared rays port 5010, and the like in addition to the above-described objects. FIG. 10B illustrates a portable image reproducing device (e.g., a DVD reproducing device) provided with a memory medium, which can include a second display portion 5002, a memory medium reading portion 5011, and the like in addition to the above objects. FIG. 10C illustrates a portable game machine which can include the memory medium reading portion 5011 and the like in addition to the above-described objects. FIG. 10D illustrates a portable game machine which can include the second display portion 5002, the memory medium reading portion 5011, and the like in addition to the above objects. FIG. 10E illustrates a television receiver which can include a tuner, an image processing portion, and the like in addition to the above objects. FIG. 10F illustrates a portable television receiver which can include a charger 5017 that can transmit and receive signals and the like in addition to the above objects. FIG. 10G illustrates an example of a slot machine which is a large-sized game machine and can include an operation means such as a start lever or a stop switch, a coin slot, a speaker, and the like in addition to the above objects.

Figure 11A:
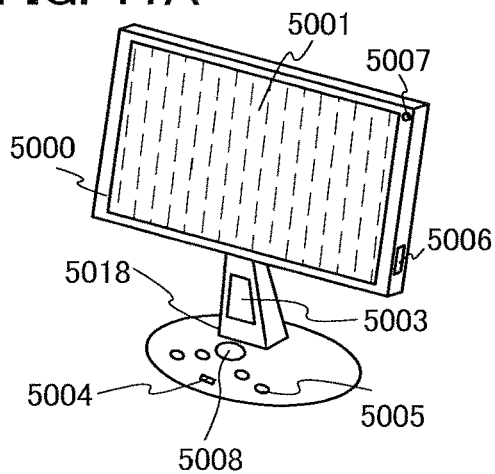
FIGS. 11A to 11G each illustrate an example of an electronic device according to on embodiment of the present invention.
Figure 11B:
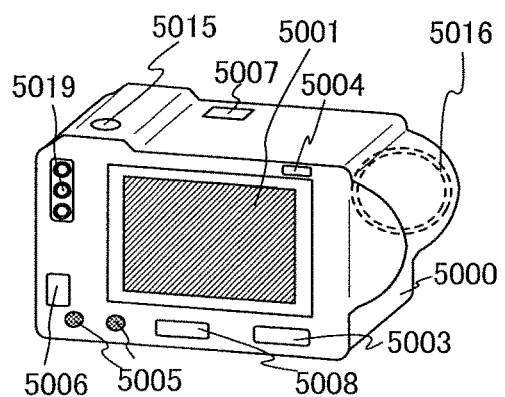
Figure 11C:
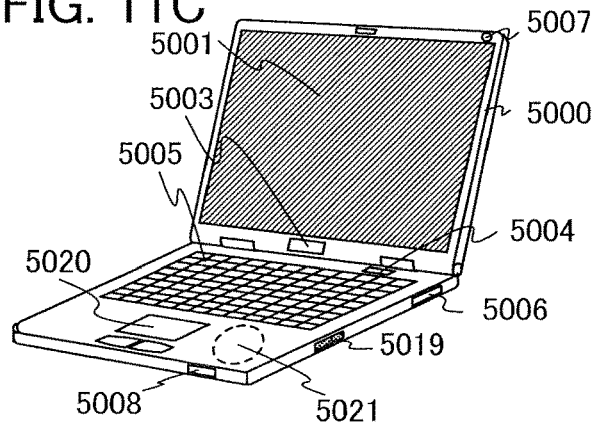
Figure 11D:
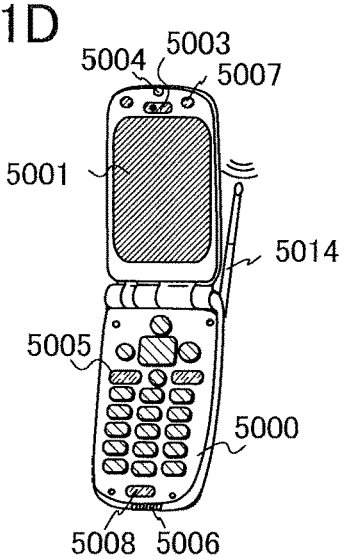

FIG. 11A is a display which can include a supporting board 5018 and the like in addition to the above-described objects. FIG. 11B illustrates a camera which can include an external connecting port 5019, a shutter button 5015, an image receiver portion 5016, and the like in addition to the above objects. FIG. 11C is a computer which can include a pointing device 5020, the external connecting port 5019, a reader/writer 5021, and the like in addition to the above-described objects. FIG. 11D illustrates a mobile phone which can include an antenna 5014, a tuner of one-segment partial reception service for mobile phones and mobile terminals, and the like in addition to the above objects.

The electronic devices illustrated in FIGS. 10A to 10G and FIGS. 11A to 11D can have a variety of functions, for example, a function of displaying a variety of information (a still image, a moving image, a text image, and the like) on a display portion, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading program or data stored in a memory medium and displaying the program or data on a display portion. Further, the electronic device including a plurality of display portions can have a function of displaying image information mainly on one display portion while displaying text information on another display portion, a function of displaying a three-dimensional image by displaying images where parallax is considered on a plurality of display portions, or the like. Furthermore, the electronic device including an image receiver portion can have a function of shooting a still image, a function of shooting a moving image, a function of automatically or manually correcting a shot image, a function of storing a shot image in a memory medium (an external memory medium or a memory medium incorporated in the camera), a function of displaying a shot image on the display portion, or the like. Note that functions which can be provided for the electronic devices illustrated in FIGS. 10A to 10F and FIGS. 11A to 11D are not limited thereto, and the electronic devices can have a variety of functions.

Electronic devices described in this embodiment are characterized by having a display portion for displaying some sort of information. In addition, with the electronic devices in this embodiment, comfortable input feeling can be obtained when the touch sensor portion provided on the display portion is pressed. Further, an image which has small deterioration of image quality and high quality can be displayed. Moreover, even when the touch sensor portion is operated, deterioration of image quality can be suppressed.

Next, application examples of the display device are described.

Figure 11E:
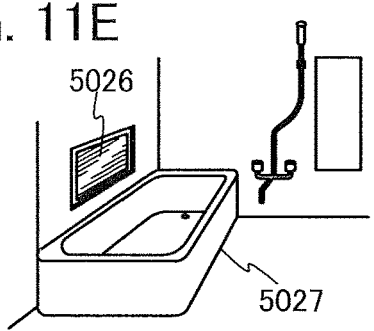

FIG. 11E illustrates an example in which the display device is incorporated in a constructed object. A display panel 5026 is integrated with a prefabricated bath 5027, so that a person who takes a bath can watch the display panel 5026. The display device is incorporated in the constructed object, which can be provided without requiring a large space.

Note that although this embodiment gives the prefabricated bath as an example of the building, this embodiment is not limited to this and the display device can be provided in a variety of buildings.

Next, examples where the display device is incorporated with a moving object are described.

Figure 11F:
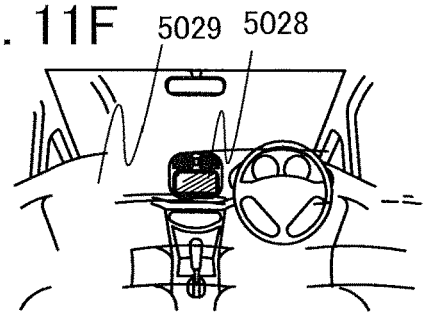

FIG. 11F illustrates an example in which the display device is provided in a vehicle. A display panel 5028 is provided in a body 5029 of the vehicle and can display information input from the operation of the body or the outside of the body on demand. Note that a navigation function may be provided.

Figure 11G:
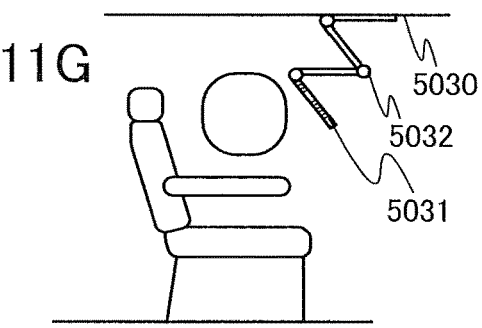

FIG. 11G illustrates an example in which the display device is incorporated in a passenger airplane. FIG. 11G illustrates a usage pattern when a display panel 5031 is provided on a ceiling 5030 above a seat in the passenger airplane. The display panel 5031 is integrated with the ceiling 5030 through a hinge portion 5032, and a passenger can watch the display panel 5031 by extending and contracting the hinge portion 5032. The display panel 5031 has a function of displaying information when operated by the passenger.

Note that although this embodiment gives the body of the vehicle and the body of the plane as examples of the moving body, this embodiment is not limited thereto. The display device can be provided to a variety of moving bodies such as a two-wheel motor vehicle, a four-wheel vehicle (including a car, bus, and the like), a train (including a monorail, a railway, and the like), and a ship.

This embodiment can be combined with any of the other structures disclosed in other embodiments, as appropriate.

Note that the present invention is not limited to the above description because it will be easily understood by those skilled in the art that various changes and modifications can be made without departing from the spirit and scope of the present invention. Therefore, unless such changes and modifications depart from the scope of the invention, they should be construed as being included therein.

This application is based on Japanese Patent Application serial No. 2009-016534 filed with Japan Patent Office on Jan. 28, 2009, the entire contents of which are hereby incorporated by reference.

What is claimed is:

1. A semiconductor device comprising:
    a liquid crystal display panel comprising a first substrate including a thin film transistor, a second substrate over the first substrate, and a sealing material between the first substrate and the second substrate;
    a touch sensor portion over the liquid crystal display panel;
    an elastic member below the liquid crystal display panel, the elastic member being configured to contract when the touch sensor portion is pressed; and
    a backlight unit below the liquid crystal display panel,
    wherein the elastic member has a first region overlapped with the sealing material and a second region overlapped with the thin film transistor,
    wherein the backlight unit has a first region overlapped with the sealing material, a second region overlapped with the thin film transistor, and a third region overlapped with the elastic member, and
    wherein the elastic member is between the liquid crystal display panel and the backlight unit.

2. The semiconductor device according to claim 1, wherein the touch sensor portion is provided on the second substrate.

3. The semiconductor device according to claim 1, wherein a height of the elastic member is within a range of 0.5 mm to 20 mm.

4. The semiconductor device according to claim 1, wherein a height of the elastic member is within a range of 5 mm to 10 mm.

5. The semiconductor device according to claim 1, wherein the touch sensor portion includes any one of a resistive film touch sensor, a capacitive touch sensor, an electromagnetic induction touch sensor, and an optical touch sensor.

6. The semiconductor device according to claim 1, wherein the elastic member is any one of a urethane sponge, rubber, cushion tape, and a spring.

7. The semiconductor device according to claim 1, wherein the backlight unit is an edge-light type backlight unit or a direct type backlight unit.

8. The semiconductor device according to claim 1, wherein the elastic member is provided to overlap with a region that is an outside of a pixel portion in the liquid crystal display panel.

9. The semiconductor device according to claim 1, wherein a width of the elastic member is larger than a width of the sealing material in a cross-sectional view of the semiconductor device.

10. A semiconductor device comprising:
    a liquid crystal display panel comprising a first substrate including a thin film transistor, a second substrate over the first substrate, and a sealing material between the first substrate and the second substrate;
    a touch sensor portion over the liquid crystal display panel;
    an elastic member below the liquid crystal display panel, the elastic member being configured to contract when the touch sensor portion is pressed; and
    a backlight unit overlapped with the elastic member below the liquid crystal display panel,
    wherein the elastic member has a region overlapped with the thin film transistor, wherein the backlight unit has a region overlapped with the thin film transistor, and wherein the elastic member is between the liquid crystal display panel and the backlight unit.

11. The semiconductor device according to claim 10, wherein the touch sensor portion is provided on the second substrate.

12. The semiconductor device according to claim 10, wherein a height of the elastic member is within a range of 0.5 mm to 20 mm.

13. The semiconductor device according to claim 10, wherein a height of the elastic member is within a range of 5 mm to 10 mm.

14. The semiconductor device according to claim 10, wherein the touch sensor portion includes any one of a resistive film touch sensor, a capacitive touch sensor, an electromagnetic induction touch sensor, and an optical touch sensor.

15. The semiconductor device according to claim 10, wherein the elastic member is any one of a urethane sponge, rubber, cushion tape, and a spring.

16. The semiconductor device according to claim 10, wherein the backlight unit is an edge-light type backlight unit or a direct type backlight unit.

* * * * *